United States Patent
Bartlow et al.

(10) Patent No.: US 10,953,666 B2
(45) Date of Patent: Mar. 23, 2021

(54) RATIO-BASED ADAPTIVE SWITCHING TECHNIQUE

(71) Applicant: Hewlett-Packard Development Company, L.P., Spring, TX (US)

(72) Inventors: Brian Bartlow, Boise, ID (US); Brian C Mayer, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 176 days.

(21) Appl. No.: 16/461,499

(22) PCT Filed: Jan. 17, 2017

(86) PCT No.: PCT/US2017/013822
§ 371 (c)(1),
(2) Date: May 16, 2019

(87) PCT Pub. No.: WO2018/136040
PCT Pub. Date: Jul. 26, 2018

(65) Prior Publication Data
US 2019/0344583 A1  Nov. 14, 2019

(51) Int. Cl.
*B41J 2/525* (2006.01)

(52) U.S. Cl.
CPC ..................... *B41J 2/525* (2013.01)

(58) Field of Classification Search
CPC ....... B41J 2/525; G03G 15/50; G03G 15/553; G03G 15/5083; G03G 15/556; G03G 15/0121; H04N 1/46
See application file for complete search history.

(56) References Cited

U.S. PATENT DOCUMENTS

| | | |
|---|---|---|
| 6,317,218 B1 | 11/2001 | Yorkey et al. |
| 7,296,870 B2 | 11/2007 | Tyson et al. |
| 8,248,623 B2 | 8/2012 | Sakamoto |
| 8,412,060 B2 | 4/2013 | Watanabe |
| 8,886,060 B2 | 11/2014 | Kakigi |
| 2004/0075855 A1 | 4/2004 | Tyson et al. |
| 2009/0232538 A1* | 9/2009 | Cook ............... G03G 15/01 399/82 |

FOREIGN PATENT DOCUMENTS

| | | |
|---|---|---|
| EP | 1339218 A2 | 8/2003 |
| EP | 2511768 | 10/2012 |
| JP | 2012-18 735 | 10/2012 |
| JP | 2013083977 | 5/2013 |
| JP | 2016-050980 | 4/2016 |
| KR | 2008-0101519 | 11/2008 |

OTHER PUBLICATIONS

Burkes et al ~ "Color Vs. Mostly Black Pages and Adaptive Alienation"~ HP White Paper ~ Oct. 16, 2007 ~ 5 pages.

* cited by examiner

*Primary Examiner* — Huan H Tran
(74) *Attorney, Agent, or Firm* — HP Inc. Patent Department (57) ABSTRACT

A print system with a ratio-based adaptive switching technique includes a printing unit to print an image on a recording medium in a color mode or a monochrome mode. A number (cM) of monochrome pages printed in the color mode and a total number (pN) of printed pages are monitored. A ratio cM/pN that is indicative of excess cartridge wear of the print system is determined. Print-job performance and cartridge wear of the print system are optimized based on the determined ratio using a first and second threshold.

15 Claims, 4 Drawing Sheets

RATIO-BASED ADAPTIVE SWITCHING TECHNIQUE

BACKGROUND

Most color-capable laser printers have two modes of operation, a color mode and a monochrome mode. In the color mode, a color cartridge (typically having additive primaries cyan ("C"), magenta (""M") and yellow ("Y")) is engaged and available for use along with a monochrome cartridge (typically black or "K"). In monochrome-only (mono or black) mode, the monochrome cartridge is engaged and available for use while the color cartridge is dis-engaged (also termed as "alienated") to save engaged wear on the color cartridge for black-only pages. Several seconds are characteristically taken to complete a switch back and forth between the color and monochrome modes and this switching consequently delays a print-job. During this switch the color cartridge as well as other printer components may experience additional wear. Both the engaged wear and the additional wear occur with both two-cartridge (separate black and color) printers and all-in-one cartridge printers (combined black and color).

BRIEF DESCRIPTION OF THE DRAWINGS

The disclosure is better understood with reference to the following drawings. The elements of the drawings are not necessarily to scale relative to each other. Rather, emphasis has instead been placed upon clearly illustrating the claimed subject matter. Furthermore, like reference numerals designate corresponding similar parts through the several views.

DETAILED DESCRIPTION

Because switching impacts printing performance and creates unwanted noise, users prefer minimal switching between modes and thus a color cartridge may be engaged (de-alienated) by default. Unfortunately, in some usage patterns of a printer, when a color cartridge is engaged to prevent switching, a color cartridge may wear out before its color toners are depleted. This premature wear-out is not desired by users of the printer. Accordingly, it is very difficult to keep printing performance acceptable while at the same time minimizing unneeded wear on the color cartridges.

To address these issues, a printing system having an adaptive switching technique based on a ratio of two recorded parameters that indicate wear is disclosed herein. The ratio is used to balance the optimization of both print-job performance and excess color cartridge wear. This dynamic ratio-based adaptive switching technique is used for determining when and how to dis-engage (alienate or switch-out) color cartridges to minimize excess wear. The two recorded parameters are the total number of pages printed (pN) and the number of black-only monochrome pages printed in color mode (cM). A ratio of cM to pN (cM/pN) is computed and compared to two thresholds separated by a hysteresis window. When the largest threshold is exceeded then the color cartridges are dis-engaged (alienated) to preserve color cartridge life by reducing unnecessary wear when printing monochrome pages. Once the color cartridges are not printing monochrome pages, the ratio cM/pN begins to drop. Once the lower of the two thresholds is reached, the color cartridges are engaged (de-alienated) or switched back in during monochrome printing to minimize the print-job performance impact. This ratio-based adaptive switching technique maintains a balance between both color and color mode monochrome printing, and color and black-only monochrome printing. More specific detail of example implementations and various possible modifications follow in the detailed description of the drawings.

Figure 1:
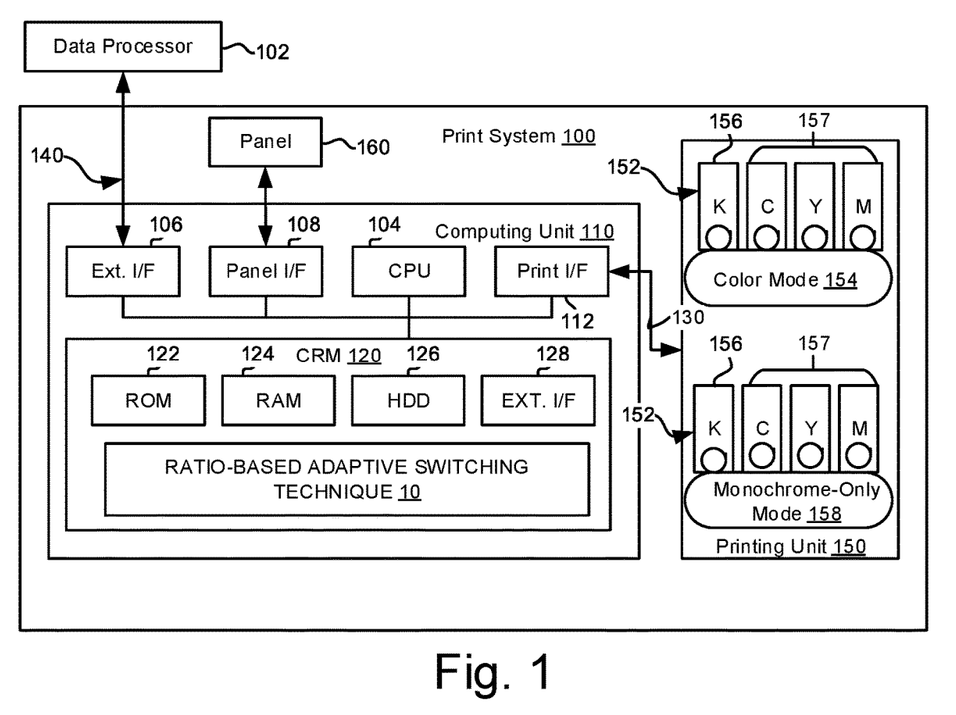
FIG. 1 is a simplified block diagram of an example print system with a ratio-based adaptive switching technique illustrated by hardware components.

For instance, FIG. 1 is a simplified block diagram of an example print system 100 with a ratio-based adaptive switching technique 10 illustrated with hardware components. Print system 100 includes a computing unit 110 and a printing unit 150. The computing unit 110 may include a panel interface (Panel I/F) 108 typically coupled to a panel 160, such as an LCD, LED, plasma, OLED, AM-LED, IPS, or other display to provide visual indications of progress, options, and supply readiness to a user. Also, the computing unit 110 through and external display interface (EXT. D I/F) 106 typically receives one or more print-jobs 140 from one or more data processors 112. Data processors may encompass a personal computer, a laptop, cell phone, print server, cloud-based server, and other equivalent computer systems that process various electronic data into printable content. The print-jobs 140 may contain monochrome-only (e.g., black-only), color-only, or mixed monochrome and color data-sets. Computing unit 110 includes one or more CPUs 124 having one or more cores capable of executing one or more software threads of instructions. The computing unit 110 and the printing unit 150 may be typically electronically coupled via a data bus 130 through a print interface 112.

Computing unit 110 may include tangible, non-transitory computer-readable medium (CRM) 120, such as read-only memory (ROM) 122, random-accessible memory (RAM) 124 (such as DRAM and SRAM), hard disk drives (HDD) 120, and external memories through an external interface (Ext. I/F) 128. The external interface may connect to external SCSI, ATA, USB, Firewire, network based, cloud-based, and other forms of remote memory known to those of skill in the art. The CRM 120 contains instructions in the form of computer executable code that when read by a processor, such as CPU 124, allows the processor to execute one or more software routines or modules, such as ratio-based adaptive switching technique 10.

CRM 120 allows for storage of one or more sets of data structures and instructions (e.g. software, firmware, logic) expressed or utilized by any one or more of the methodologies or functions described herein. The instructions may also reside, completely or at least partially, with the static memory, the main memory, and/or within the processor during execution by the computing system. The main memory, ROM 122 and RAM 124 and the CPU 124 memory also constitute computer readable medium 120. The term "computer readable medium" 120 may include single medium or multiple media (centralized or distributed) that store the one or more instructions or data structures. The computer readable medium 120 may be implemented to include, but not limited to, solid state, optical, and magnetic media whether volatile or non-volatile. Such examples include, semiconductor memory devices (e.g. Erasable Programmable Read-Only Memory (EPROM), Electrically Erasable Programmable Read-only Memory (EE-PROM), and flash memory devices), magnetic discs such as internal hard drives and removable disks, magneto-optical disks, and CD-ROM (Compact Disc Read-Only Memory) and DVD (Digital Versatile Disc) disks.

The various examples described herein may include logic or several components, modules, or constituents. Modules may constitute either software modules, such as code embedded in tangible non-transitory computer readable medium 120) or hardware modules. A hardware module is a tangible unit capable of performing certain operations and may be configured or arranged in certain manners. In one example, one or more CPUs 124 or one or more hardware modules of computing unit 110 may be configured by software (e.g. an application, or portion of an application) as a hardware module that operates to perform certain operations as described herein.

In some examples, a hardware module may be implemented as electronically programmable. For instance, a hardware module may include dedicated circuitry or logic that is permanently configured (e.g. as a special-purpose processor, state machine, a field programmable gate array (FPGA) or an application specific integrated circuit (ASIC) to perform certain operations. A hardware module may also include programmable logic or circuity (e.g. as encompassed within a general-purpose processor or other programmable processor) that is temporarily configured by software to perform certain operations. It will be appreciated that the decision to implement a hardware module electronically in dedicated and permanently configured circuitry, or in temporarily configure circuitry (e.g. configured by software) may be driven by cost and time considerations.

The printing unit 150 may have one or more modes of operation, such as color mode 154 and monochrome mode 158. In the color mode 154, each of the black ("K") and color ("C", "Y", "M") cartridges 152 are engaged and available for use in printing documents of a print-job 140. In monochrome mode 158, the "K" cartridge 156 is engaged and available for use in printing while the color "C", "Y", "M" cartridges 157 are dis-engaged (alienated) and not available for use in printing.

The print system 100 may include one or more adaptive switching techniques 10 (see for instance, flowchart 500 in FIG. 5 and flowchart 600 in FIG. 6) selectable by users or to operate automatically and applicable for both two-part and all-in-one toner cartridge systems to minimize unneeded wear on the color cartridges 157 when they are not used during printing of monochrome pages. The various adaptive switching techniques 10 also improve print-job performance by minimizing when switching between color mode 154 and monochrome modes 158 is used. In one adaptive switching technique 10, a ratio 306 (FIG. 3) is determined by monitoring a number (cM 314, a first behavior) of black-only monochrome (mono) pages printed while in color mode to the total number of pages printed (pN 302, a second behavior). This ratio 306 (cM/pN) is indicative of the unneeded wear on the color cartridge 157 components. For instance, when the ratio is near 1, then there is excess unneeded wear on the color cartridges 157. When the ratio is near 0, there is minimal unneeded wear on the color cartridges 157. However, to come close to achieving this low ratio there may be frequent switching of the color cartridge 157 components in (de-alienate) and out (alienate) of a print path of print system 100. This switching action may create undesired noise and print-job delay, thereby impacting print-job 140 performance. Hence, it is difficult to minimize the amount of additional wear on the color cartridges while keeping acceptable system performance.

One goal of the adaptive switching techniques 10 is to therefore to minimize the performance impact of switching between modes to when it is needed to preserve color cartridge life when there is adequate toner available. Accordingly, the adaptive switching techniques 10 optimize both print-job performance and excess cartridge wear of the system based on the determined ratio. The result is a balance between pages of both a) Color and Color Mode Mono, and 2) Color and Black (K)-only Mono.

Figure 2:
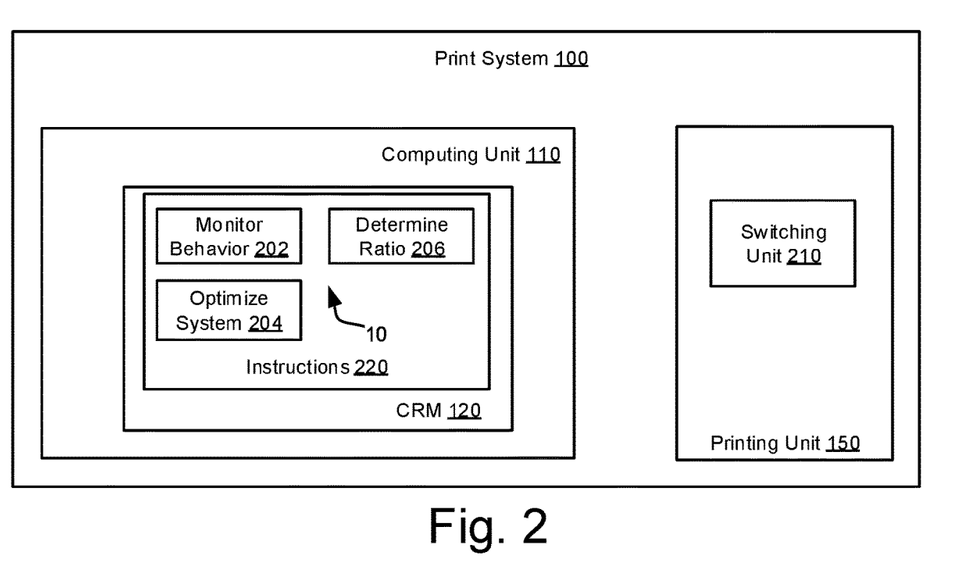
FIG. 2 is a simplified block diagram of the example print system of FIG. 1 with a ratio-based adaptive switching technique illustrating the functionality of the print system in hardware and software modules.

FIG. 2 is a simplified block diagram of the print system 100 of FIG. 1 with a ratio-based adaptive switching technique 10 illustrating the functionality of print system 100 in hardware and software modules or combinations of hardware and software modules depending upon specific implementations. Print system 100 includes computing unit 110 and printing unit 150. Computing unit 110 includes CRM 120 with instructions 220 to implement a ratio-based adaptive switching technique 10 in the form of one or more modules, such as monitor behavior module 202, determine ratio module 206 and optimize system module 204. The various modules may be part of a single overall module or program or may be implemented as one or more subroutines, object-oriented software objects, or separate autonomous program modules. Further various functionality of the modules may be shared, interoperate, or reside otherwise between the different modules. In one example, the computing unit 110 communicates with printing unit 150. The printing unit 150 may include one or more hardware and/or software modules to implement a switching unit 210 to switch between the color mode 154 and the monochrome mode 158 of print system 100. In some examples, the computing unit 110 may also be partially or fully implemented as part of printing unit 150. Also, the CRM 120, instructions 220, and one or more of the various modules to implement a ratio-based adaptive switching technique 10 may also reside partially or fully in printing unit 150.

Figure 3:
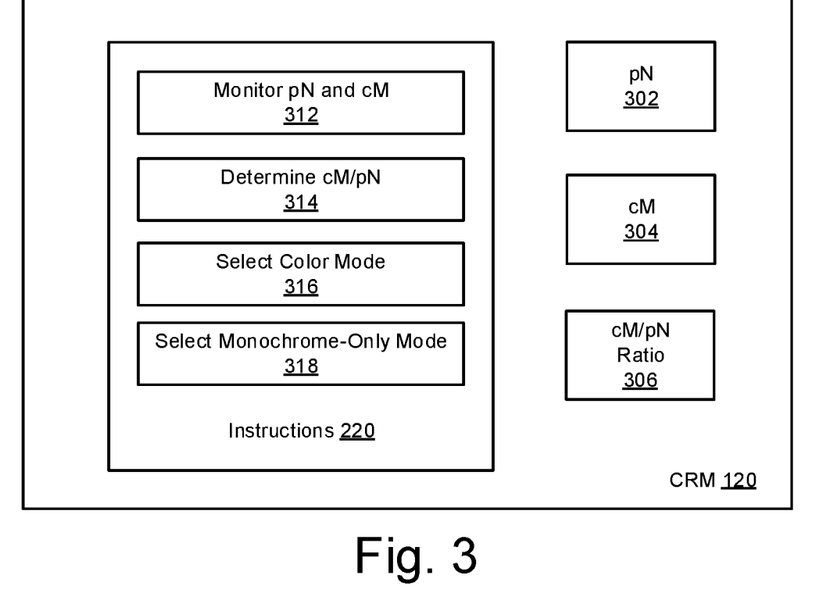
FIG. 3 is a block diagram of an example computer readable medium with processor executable instructions organized into sub modules to implement a ratio-based adaptive switching technique.

FIG. 3 is a block diagram of an example computer readable medium 120 with processor executable instructions 220 organized into sub modules to implement a ratio-based adaptive switching technique 10 that balances print-job performance and component wear.

In module 312, the instructions monitor a total number (pN) of printed pages 302 performed by print system 100 with both color mode 154 and monochrome mode 158 and a number (cM) of monochrome pages performed by print system 100 in a color mode 154. In module 314, the instructions 220 determine a ratio of cM 304 to pN 302 (cM/pN) 306. In module 316, the instructions 220 select the print system 100 to select the color mode 154 when the ratio is less than a first threshold. In module 318, the instructions select the print system 100 to select a monochrome mode 158 when the ratio 306 is more than second threshold. In some example implementations, there may be more than one switching technique used to determine the current printing mode as discussed below. Therefore, the print system 100 may include more than one adaptive switching technique 10 and each technique may share or include their own unique counters (cM, pN) and threshold values.

Figure 4:
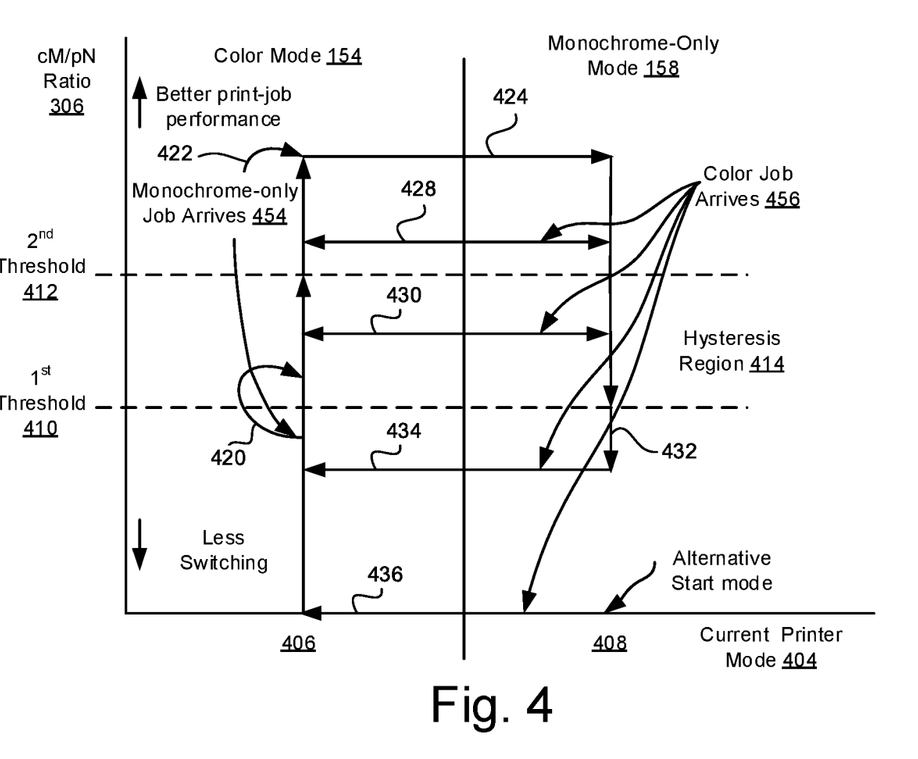
FIG. 4 is an example state transition diagram showing a current printer mode on the horizontal axis and a determined cM/pN ratio on the vertical axis.

FIG. 4 is an example state transition diagram 400 showing the current printer mode 404 on the horizontal axis and the determined cM/pN ratio 306 on the vertical axis. The current printer mode may also encompass selection a default or "home" printer mode, which could be either color mode 154 or monochrome-only mode 158. In this example, print system 100 may change the default home mode to optimize for the current content type that users are most printing. This change of default home mode may be the most optimal for print-job 140 performance. In some examples, however, it may be that the default home mode always remains color mode 154, and that on the receipt of a monochrome-only job, the print system 100 switches to monochrome-only mode 158. In other examples, the default home mode may be monochrome-only mode 158 and the print system 100 switches to color mode 154 when a color job arrives 456.

The vertical axis of cM/pN ratio 306 includes a first threshold 410 and a greater second threshold 412, the difference between the two thresholds create a hysteresis region 414. In general, a lower threshold value indicates more switching may occur, a greater threshold value indicates a desire for better print-job performance. To begin with, a printer system 100 with new black 156 and color 157 cartridges may typically initialize the start mode 406 of current printer mode 404 in color mode 154. As various print-jobs 140 are received, including when monochrome job arrives 454, the computing unit 110 tracks the total number of pages printed pN 302 and the number cM 304 of black-only or monochrome pages printed in color mode 154 of the print system 100. The ratio 306 of cM to pN will increase when there is a greater number of monochrome pages being printed than when there are pages with color being printed while in color mode 154. As more pages with color are printed and correspondingly less monochrome pages printed, the ratio 306 will decrease.

Once the ratio 306 reaches a first threshold 410 and a second threshold 412, depending on the current printer mode 404 state, different actions will occur. For instance, while in color mode 154, when a monochrome job, such as monochrome job 420 arrives while the ratio 306 is less than the second threshold 412, the current printer mode 404 remains in the color mode 154 state while the ratio 306 increases due to the monochrome pages being printed while in color mode 154. However, once the ratio 306 increases beyond the second threshold 412, such as by printing mixed black and color print-jobs with more black than color pages, and then a further monochrome job 422 arrives, the print system 100 changes the current printer mode 404 to monochrome mode 158 as shown by state arrow 424. While in monochrome mode 158, when monochrome print-jobs 140 arrive and are printed, the ratio 306 will decrease as the numerator cM stays constant while the denominator pN continues to increase. Note that, when a print-job with color job 456 arrives (as shown by state arrows 428, 430, and 434) the print system 100 switches to color mode 154 to allow for the color printing.

Depending on the ratio 306 value with respect to the first threshold 410 and second threshold 412, the printer may stay in color mode 154, such as with state arrow 434, or it may return to monochrome mode 158, such as with state arrows 430 and 428. Stated otherwise, once the ratio 306 has exceeded the second threshold 412, the print system 100 will switch or transition to monochrome mode 158 upon receiving a monochrome print-job 140. Once in the monochrome mode 158 after the second threshold 412 has been reached, printing of monochrome print-jobs will decrease the ratio 306. Until the ratio 306 has decreased to the first threshold 410, any print-job 140 received that has a color page will cause the print system 100 to temporarily transition (as shown by state arrows 428, 430) to color mode 154 to print the color pages and then transition back to monochrome mode 158 as the current printer mode 404 to reduce wear on the color cartridge 157 components. While in monochrome mode 158, when the ratio 306 is less than the first threshold 410, any received print-job 140 with a color page will cause the current printer mode 404 to switch non-temporarily back to color mode 154, as shown by state arrow 434.

In some example implementations of print system 100, such as by user option selection or based on the expected type of print-jobs to be received by print system 100, the current printer mode 404 may selected to be monochrome mode 158 in alternative start mode 408. Thus, the ratio 306 will stay at zero as all black-only or monochrome pages are printed in monochrome mode 158 and cM remains zero as pN increases. Once a color job arrives 456, the print system 100 current printer mode 404 will transition to color mode 154 as shown by state arrow 436. The ratio 306 may then continually increase as monochrome pages are printed in color mode 154. This example implementation allows for minimizing wear of color cartridges 157 until an actual color job arrives 456.

In another example implementation, the module 312 includes instructions 220 to have the print system 100 wait until the number of printed pages pN 302 exceeds a predetermined number before the instructions 220 in modules 316 and 318 are executed by the processor to select the print system modes (i.e. color mode 154, monochrome mode 158).

In yet another example, the instructions 220 may include an additional module to analyze actual usage patterns of the print system 100 and adjust one or both the first threshold 410 and the second threshold 412 to reduce transitions between the color mode and the monochrome mode and thereby minimize an amount of color cartridge 157 life while the print system 100 prints monochrome pages. Also, the instructions 220 may also consider component life within cartridges 152, such as toner and wear components, and adjust one or both the first threshold 410 and the second threshold 412 based at least partially on the component life. For instance, if an estimated life of the toner remaining in a color cartridge 157 is less than an estimated remaining life of the wear components of the color cartridge 157, or the trend of the toner life is decreasing faster than the trend of the remaining life of the wear component then the second threshold 412 may be raised to keep print system 100 performance as the color toner will likely run out before the wear components wear out. Alternatively, the first threshold 410 may be raised to reduce the hysteresis region to allow print system 100 to default back to color mode more quickly when a color job arrives 456 as the color cartridge 157 may take on more wear before the color toner is expected to expire. In yet another example, both the first threshold 410 and the second threshold 412 may be raised to emphasize print performance over component wear.

If the estimated wear life is less than the estimated toner life and/or the trend is that the estimated wear life is decreasing faster than the estimated toner life, either or both the first threshold 410 and the second threshold 412 may be reduced to cause the print system 100 to have the current printer mode 404 be in monochrome mode 158 as it would appear from the usage patterns that most current print-jobs are monochrome and it would be prudent to stay in the monochrome mode 158 as a default to emphasize decreased component wear over print performance.

In fact, some example implementations may include a learning system to continually analyze usage patterns of the print system 100 and have the learning system dynamically optimize performance behavior based on real-time usage of the print system 100. For instance, normally, when the second threshold 412 is reached and it is determined to switch to monochrome mode 158 from color mode 154, it may be assumed that the print system 100 will switch back to color model 54 eventually. Therefore, one may assume that any switch from color mode 154 to monochrome mode 158 will also have a monochrome mode 158 to color mode 154 switch as well. Accordingly, if a final page of a print-job 140 is often monochrome, one can relax this assumption and get more aggressive to lower the setting of the second threshold 412 and perhaps also the first threshold 410 to trigger a faster change to monochrome mode 158 because the overall cost to print-job performance is likely to be lower as it appears most print-jobs are monochrome only or mostly monochrome.

For print system 100, an example learning system may thus detect that the final page before a spin-down of the paper feed components is often or usually monochrome. Perhaps in this situation, a user is printing a set of letters where the first page of a letter has a color logo and all following pages of the letter are monochrome. Thus, most of the pages of the set of letters may be assumed to be monochrome and as such, a switch to color mode 154 to print the color logo and a quick switch back to monochrome mode 158 for the monochrome pages can reduce wear on the color components without significantly reducing the overall print system 100 performance. Consequently, a learning system may look for opportunistic usage patterns and adjust the threshold levels accordingly to balance the print-job performance and cartridge wear to match more closely current usage patterns of print system 100.

Therefore, a print system 100 may include a printing unit 150 to print an image on a recording medium in a color mode 154 or a monochrome mode 158. The printing unit 150 may include a switching unit 210 to switch the printing unit 150 between the color mode 152 and the monochrome mode 158. A computing unit 110 is configured with instructions to perform operations. Such operations include instructions to monitor a number (cM) 304 of monochrome pages printed in the color mode 154 and a total number (pN) 302 of printed pages. The instructions also determine a ratio 306 cM/pN that is indicative of unnecessary excess cartridge 156, 157 wear of the print system. The instructions then optimize print-job 140 performance and cartridge 156, 157 wear of the print system based on the determined ratio 306. In some examples, the computing unit 110 does not optimize until at least a predetermined total number of printed pages pN 302 has accumulated to better derive an accurate understanding of a standard usage of the print system 100. In yet other examples, the computing unit 110 optimizes by minimizing both the number of transitions between the color mode 154 and the monochrome mode 158 and the life of a color cartridge 157 in the print system 100 that is used while printing monochrome pages. As noted above, the computing unit 110 may also be configured to perform a learning system to allow for dynamically optimizing the print-job performance and the cartridge wear based on real-time usage of the print system 100. Accordingly, the print system 100 may include more than one method of switching between color mode 154 and monochrome mode 158 and each method may include their own unique counters and thresholds.

Figure 5:
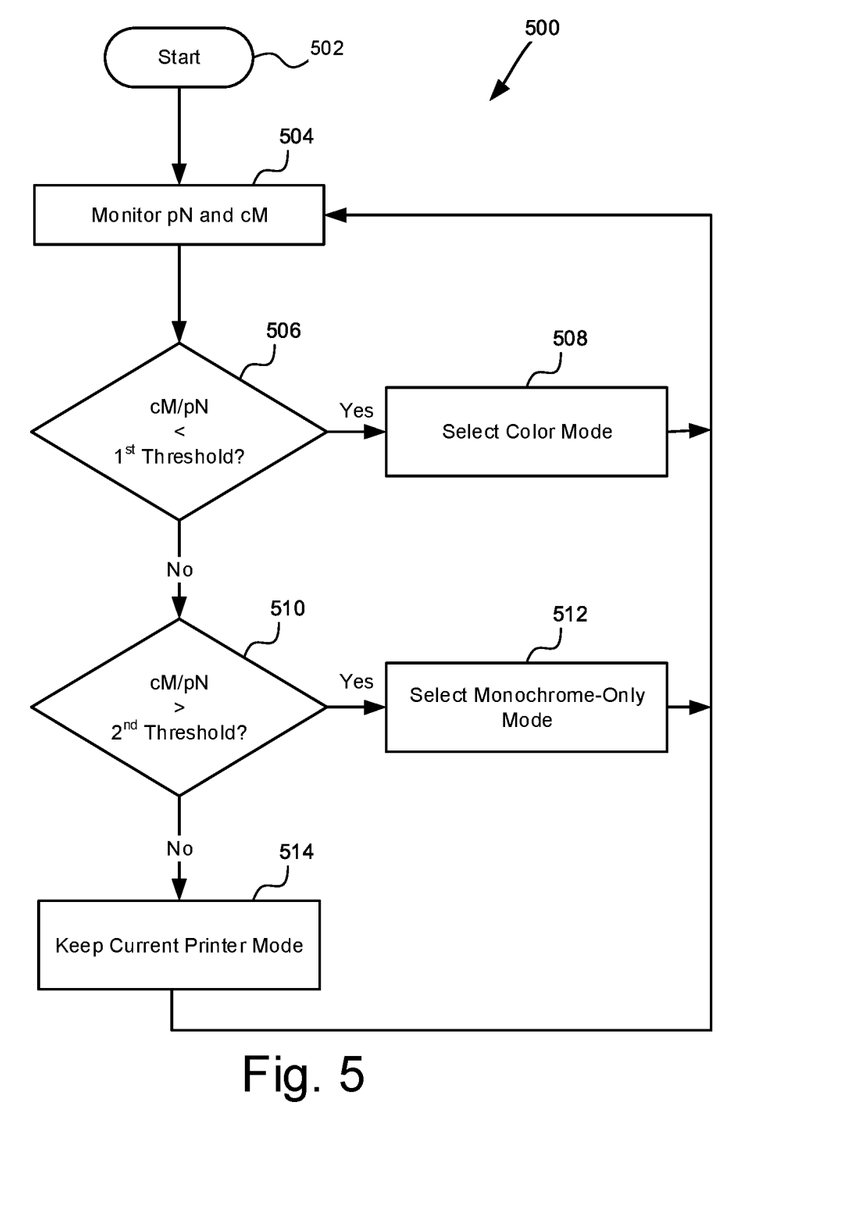
FIG. 5 is flowchart of an example ratio-based adaptive switching technique used to switch between printer modes.

FIG. 5 is flowchart 500 of an example ratio-based adaptive switching technique 10 to change between current printer modes. When the adaptive switching technique 10 begins in start block 502, it begins to monitor print system 100 for the total number of printed pages, pN 302, in both color mode 154 and monochrome mode 158 as well as the number of monochrome pages, cM 304, printed in color mode 154. In decision block 506, a ratio of cM/pN is determined whether it is less than or not a first threshold 410 and if so, selecting the color mode 154 of the print system 100 in block 508. If not less, then in decision block 510 the ratio cM/pN is determined whether it is greater or not than a second threshold 412 and if so, selecting the monochrome model 58 of the print system 100 in block 512. If not greater, and after the color or monochrome modes have been selected in blocks 508, 512, respectively, the adaptive switching technique 500 continues to block 514 to keep the current printer mode 404 and then back to block 504 to continue monitoring pN 302 and cM 304 and checking if the ratio 306 of cM/pN to the first and second thresholds in decision blocks 506, 510.

Figure 6:
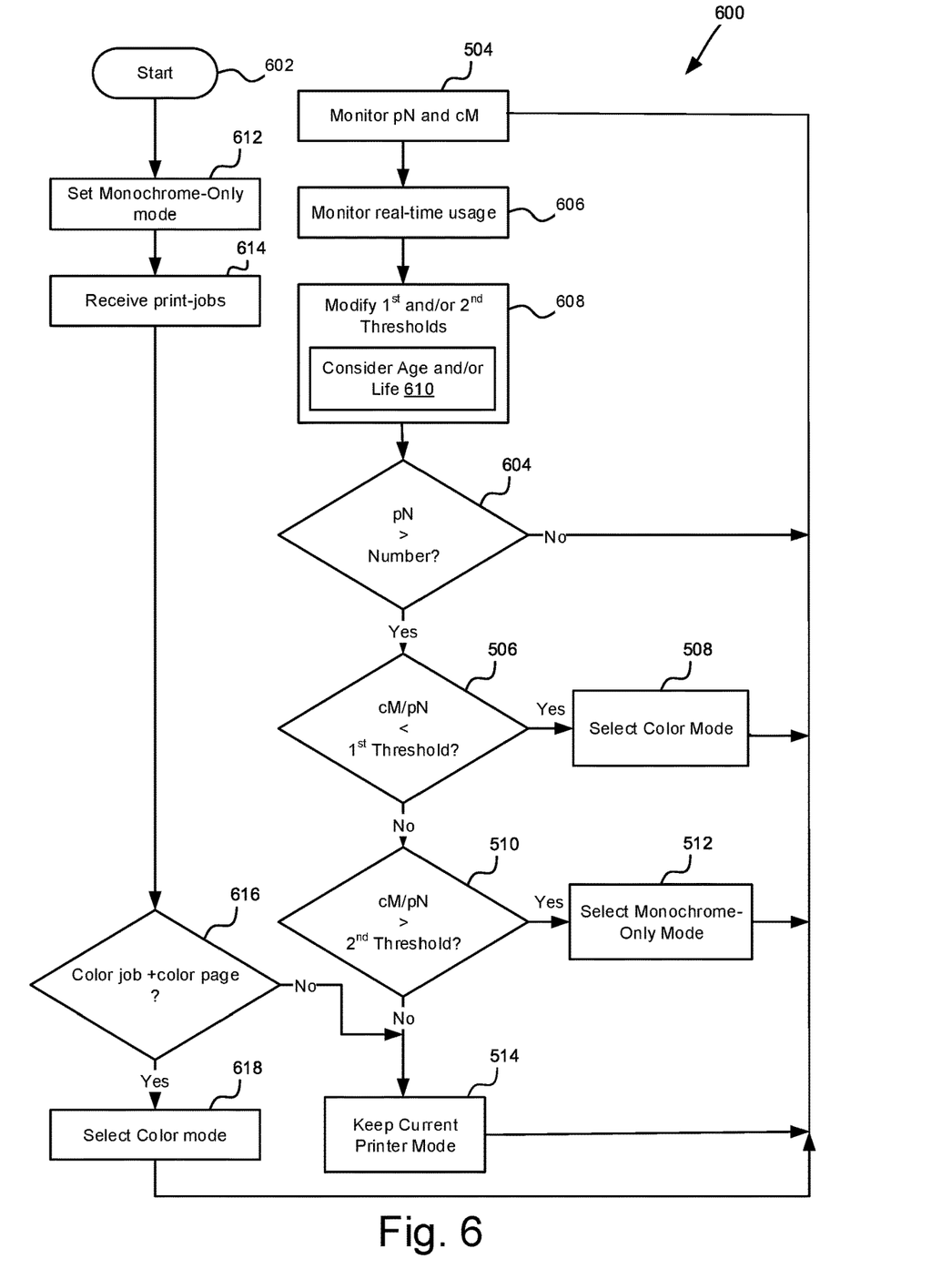
FIG. 6 is a flow chart of an example alternative ratio-based adaptive switching technique with additional possible operations that may be included to influence threshold values.

FIG. 6 is a flow chart 600 of an example alternative adaptive switching technique 10 with additional possible operations that may be included or used to influence the first and second threshold values. For instance, once the alternative adaptive switching technique 10 begins in start block 602, it similarly monitors pN 302 and cM 304 in block 504 as described for FIG. 5's flow chart. However, before checking the ratio 306 of cM/pN to the first threshold 410 and the second threshold 412 in decision blocks 506 and 510, in decision block 604 the alternative adaptive switching technique 600 waits until the total number of printed pages pN 302 exceeds a predetermined number before proceeding to determining if the ratio 306 against the first and second thresholds in blocks 506, 508, 510, 512, and 514 as described for FIG. 5. Therefore, an alternative adaptive switching technique 10 may wait until the number of printed pages exceeds a predetermined number before the elements of determining are performed.

In some implementations, an alternative adaptive switching technique 10 may include a learning module that in block 606 allows for monitoring real-time usage patterns of the print system 100 and in block 608 modifying at least one of the first threshold 410 and the second threshold 412 to minimize at least one of cartridge 156, 157 wear or optimize print-job time performance of the print system 100 based on the real-time usage patterns. Block 608 may in some implementations in block 610 also check the level or age of at least one component in a cartridge of the print system 100 and then modify at least one of the first threshold and the second threshold based on the level or age of at least one component in a cartridge of the print system. For example, if the color toner has an expiration date that is soon approaching and the timeframe to the expiration date is less than the expected time for wear out of the color cartridge 157 or the color toner level is low, then the first and second thresholds may be increased to keep emphasizing print-job performance as the color cartridge will need to be replace soon anyway.

In another implementation, the alternative adaptive switching technique 10 may include in block 612 of first selecting the monochrome mode 158 as the current printer mode 404 of the print system 100. Then in block 614 print-jobs 140 for the print system 100 are received. In decision block 616, the print-job 140 is checked to see if it is a color print-job and when a color page is to be printed and if so in block 618 the color mode 154 is selected as the current printer mode 404 for the remaining color print-job 140 before returning to block 504 and monitoring of the behavior of print system 100 using the pN and cM variables. If not, then decision block 616 proceeds to block 514 to keep the current printer mode 404.

In summary, the adaptive switching techniques 10 and hardware and software logic discussed above allows for managing the wear life an any print system 100 that has at least two possible methods of behavior (e.g. total number of printed pages (pN) 302 and number of monochrome pages printed in color mode (cM) 304) that may be controlled and/or optimized based on the real-time usage of the print system 100. In the given examples, a ratio 306 of cM to pN (cM/pN) may be controlled through use of thresholds which may be passively set or actively adjusted to achieve a balance between the print-job performance and reduced wear of color cartridge components based on usage, usage patterns, component life, amount of toner. Allowing for actively adjusted thresholds, the entire print system 100 may be analyzed and real-use print usage patterns determined. These print usage patterns may then be used to vigorously adjust the thresholds and thus the behavior of the print system 100 may be dynamically optimized for real-use patterns along with the real-time usage.

While the claimed subject matter has been particularly shown and described with reference to the foregoing examples, those skilled in the art will understand that many variations may be made therein without departing from the intended scope of subject matter in the following claims. This description should be understood to include all novel and non-obvious combinations of elements described herein, and claims may be presented in this or a later application to any novel and non-obvious combination of these elements. The foregoing examples are illustrative, and no single feature or element is central to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A print system with a ratio-based adaptive switching technique, comprising:
   a printing unit to print an image on a recording medium in a color mode or a monochrome mode and the printing unit including a switching unit to switch the printing unit between the color mode and the monochrome mode; and
   a computing unit to:
   monitor a number (cM) of monochrome pages printed in the color mode and a total number (pN) of printed pages,
      determine a ratio cM/pN that is indicative of excess cartridge wear of the print system, and
      optimize print-job performance and cartridge wear of the print system based on the determined ratio using a first threshold and a second threshold.

2. The print system of claim 1, wherein the computing unit does not optimize until at least a predetermined total number of printed pages has accumulated to derive an accurate understanding of a standard usage of the print system.

3. The print system of claim 1, wherein the computing unit optimizes by minimizing both the number of transitions between the color mode and the monochrome mode and the life of a color cartridge in the print system used while printing monochrome pages.

4. The print system of claim 1 wherein the computing unit is further to perform a learning system to allow for dynamically optimizing the print-job performance and the cartridge wear based on real-time usage of the print system.

5. The print system of claim 1 wherein the print system includes more than one method of switching between color mode and monochrome mode and each method includes their own unique counters and thresholds.

6. A non-transitory computer readable medium comprising processor executable instructions for a ratio-based adaptive switching technique that when read and executed on a processor on a print system cause the processor to:
   monitor a total number (pN) of printed pages and a number (cM) of monochrome pages in a color mode;
   determine a ratio of cM/pN;
   select the print system to switch to the color mode when the ratio is less than a first threshold; and
   select the print system to switch to a monochrome mode when the ratio is more than second threshold greater than the first threshold.

7. The non-transitory computer readable medium of claim 6, further comprising instructions to:
   analyze usage patterns of the print system; and
   adjust at least one of the first threshold and the second threshold to reduce transitions between the color mode and the monochrome mode and minimize an amount of color cartridge wear while the print system prints monochrome pages.

8. The non-transitory computer readable medium of claim 6, further comprising instructions to dynamically optimize performance behavior based on real-time usage of the print system.

9. The non-transitory computer readable medium of claim 6, wherein the print system includes a cartridge that includes black and color print components, further comprising instructions to:
   consider component life within the cartridge; and
   adjust at least one of the first threshold and the second threshold
   based at least partially on the component life.

10. The non-transitory computer readable medium of claim 6, further comprising instructions to wait until the number (pN) of printed pages exceeds a predetermined number before the instructions to select the print system to switch to color or monochrome modes are executed by the processor.

11. A method for a ratio-based adaptive switching technique, comprising:
    monitoring a first number (pN) of printed pages in both a color mode and monochrome mode and a second number (cM) of monochrome pages in the color mode by a print system;
    determining that a ratio of cM/pN is less than a first threshold and selecting the color mode as the current mode of the print system; and
    determining that the ratio cM/pN is greater than a second threshold and selecting the monochrome mode as the current mode of the print system.

12. The method of claim 11, further comprising waiting until the number of printed pages exceeds a predetermined number before the elements of determining are performed.

13. The method of claim 11, further comprising:
    monitoring real-time usage of the print system; and modifying at least one of the first threshold and the second threshold to minimize at least one of cartridge wear or optimize print-job performance of the print system.

14. The method of claim 13, further comprising modifying at least one of the first threshold and the second threshold based on age of at least one component in a cartridge of the print system.

15. The method of claim 11, further comprising:
first selecting the monochrome mode as the current mode of the print system;
receiving print-jobs for the print system; and
on receiving a color print-job and a color page, selecting the color mode of the print system for the remaining color print-job.

* * * * *